United States Patent [19]
Richley et al.

[11] Patent Number: 5,437,057
[45] Date of Patent: Jul. 25, 1995

[54] WIRELESS COMMUNICATIONS USING NEAR FIELD COUPLING

[75] Inventors: Edward A. Richley, Palo Alto; Lawrence Butcher, Mountain View, both of Calif.

[73] Assignee: Xerox Corporation, Stamford, Conn.

[21] Appl. No.: 984,821

[22] Filed: Dec. 3, 1992

[51] Int. Cl.⁶ .............................. H04B 5/00
[52] U.S. Cl. .................. 455/41; 455/33.1; 455/56.1; 455/66; 343/867
[58] Field of Search ............... 455/41, 33.1, 33.4, 455/53.1, 54.1, 54.2, 56.1, 66; 370/85.1; 342/742, 867

[56] References Cited

U.S. PATENT DOCUMENTS 4,584,707  4/1986  Goldberg et al. .................. 455/41
5,181,200  1/1993  Harrison ...................... 455/54.1 X

FOREIGN PATENT DOCUMENTS

0225607A2  6/1987  European Pat. Off. .
0452290A1  10/1991 European Pat. Off. .
61-00033   5/1986  Japan ........................... 455/41
2197160    5/1988  United Kingdom .

OTHER PUBLICATIONS

Shrader, R. L.; Electronic Communication, 5th Edition, Jan. 1, 1985 pp. 470–471.

Primary Examiner—Edward F. Urban
Assistant Examiner—Philip J. Sobutka

[57] ABSTRACT

Near field coupling is employed for transferring data back and forth between base stations and portable stations in cellular communication systems, such as cellular local area networks.

8 Claims, 9 Drawing Sheets

WIRELESS COMMUNICATIONS USING NEAR FIELD COUPLING

FIELD OF THE INVENTION

This invention relates to wireless communication systems, and more particularly, to cellular local area networks (LANs) and the like that have radio linked access channels.

BACKGROUND OF THE INVENTION

As is known, one of the advantages of cellular radio communication systems is that the system bandwidth is much greater than the bandwidth of any individual cell. Indeed, to a first approximation, the aggregate bandwidth of such a system can approach the sum of the bandwidths of the individual cells. This is an important feature of existing cellular systems because it enables them to service far more traffic than any single cell is required to handle, thereby reducing the cost and complexity of the individual cells and of the overall system.

Figure 1:
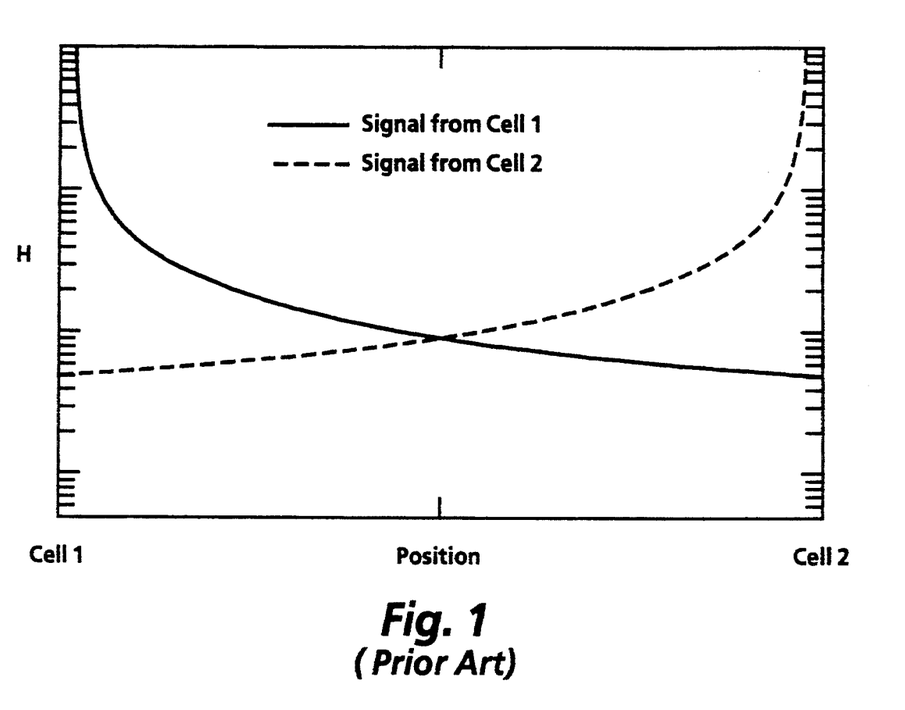
FIG. 1 is a graph illustrating a nominal field pattern from far-field radiators.

Client access (i.e., user and networked device access) to known cellular systems typically is provided by far field coupled radio links. The far field electric and magnetic field strengths of a radiating element, such as an antenna, fall-off as the inverse first power of the propagation distance, r (i.e., $1/r$), so the power falls-off as $1/r^2$. Conventionally, neighboring cells within these far field coupled cellular systems operate on different carrier frequencies (i.e., different "channels"), thereby ensuring that cells operating on like channels are spatially separated from each other by buffer zones of sufficient size to maintain an adequate signal-to-interference level throughout each of the cells. To accommodate this strategy, mobile clients are switched from channel-to-channel as they move from cell-to-cell, so sophisticated switching is required to perform these "hand-off" transitions gracefully. Clearly, therefore, significant cost savings could be realized if all cells operated on the same channel or channels. Unfortunately, however, the spatial rate at which the radiated power rolls-off in these far field systems is too gradual (see FIG. 1) to permit the use of identical channels in adjacent cells, without incurring markedly degraded performance near the boundaries of the cells and/or "dead" zones between them.

Figure 2:
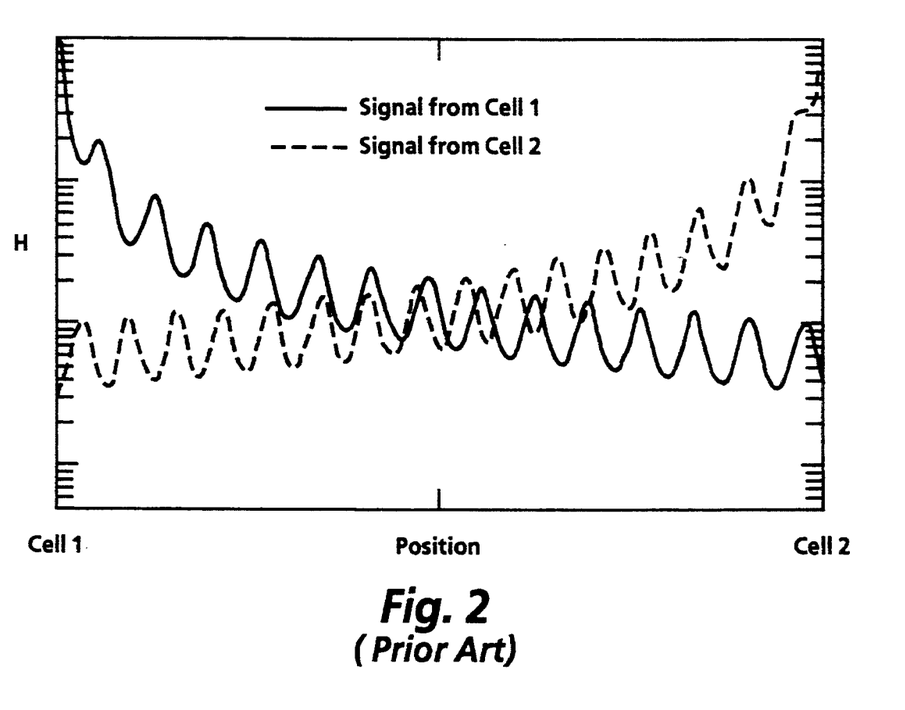
FIG. 2 is a graph illustrating an exemplary field pattern from far-field radiators in the presence of standing wave effects.

Another disadvantage of using far field coupled radio links in local communication systems, such as cellular LANs, is that these systems often are installed in environments containing various rf reflectors, such as in buildings having metal wall studs. For example, far-field coupled cellular systems generally operate at UHF frequencies to enable modest sized antennae to function as efficient radiators. However, UHF signals have wavelengths on the order of only one foot or so, which means that even relatively small objects can cause significant reflections. In buildings or similar sites, where many of the rf reflectors are spatially separated from the radiating source and from each other by distances that are relatively small multiples of the signal wavelength, such as the reflectors in and near the walls of a small room or office, such rf reflections tend to produce strong resonances. Consequently, the standing wave patterns that are associated with these resonances tend to materially perturb the radiated fields in accordance with a complex and difficult to predict pattern (see FIG. 2). Moreover the problems that are caused by these standing wave patterns would be compounded if adjacent, spatially contiguous cells were operated on the same carrier frequencies because the standing wave patterns that are generated within the adjacent cells then would cause the transitions from cell-to-cell to be non-monotonic.

Clearly, reliable wireless communications are needed to give portable computers and other mobile devices convenient access to LANs and similar services, without detracting from the portability of such devices. It also is clear that it would be extremely beneficial to be able to take advantage of the aggregate bandwidth capabilities of cellular systems in LANs, so that the bandwidth demands of multiple users can be satisfied economically.

SUMMARY OF THE INVENTION

To these ends, in accordance with the present invention, it has been found that the above problems are overcome by utilizing near field coupling for wirelessly coupling client devices to LANs.

BRIEF DESCRIPTION OF THE DRAWING

In order that the invention may be more clearly understood, it will now be disclosed in greater detail with reference to the accompanying drawing, wherein:

FIG. 9 is a simplified diagram of a modification of the invention, for communication in elongated regions such as corridors, hallways or the like.

DETAILED DESCRIPTION

A. Near Field Antennae

In addition to far field radiation, an energized antenna also produces field components which do not give rise to propagating waves. These non-propagating components are known as the "near field." and are quite analogous to the concept of reactive power in circuit theory. Near field components, which consist of electric and magnetic fields, are "bound" to the transmitting antenna. They, therefore, transfer real power only when a receiving antenna is sufficiently close to the transmitter (i.e., within its "near field region"). This is in stark contrast to the far field components which radiate energy even in the absence of a receiver. Although all active antennae exhibit near field effects, magnetic dipoles provide a useful and simple means for taking practical advantage of them. It, however, is to be noted that a completely analogous set of properties exists for electric dipoles.

Small loop antennae are surprisingly effective for the near field coupling that is contemplated by this invention, even though they are notoriously inefficient radiators. As is known, the magnetic field created by a small oscillating current circulating in a loop is defined by the following relationships:

$$H_r = \frac{IA}{2\pi} \epsilon^{-jkr} \left( \frac{jk}{r^2} + \frac{1}{r^3} \right) \cos\theta \quad (1)$$

$$H_\theta = \frac{IA}{4\pi} \epsilon^{-jkr} \left( -\frac{k^2}{r} + \frac{jk}{r^2} + \frac{1}{r^3} \right) \sin\theta \quad (2)$$

$$E_\Phi = \eta \frac{IA}{4\pi} \epsilon^{-jkr} \left( \frac{k^2}{r} - \frac{jk}{r^2} \right) \sin\theta \quad (3)$$

wherein A is the area of the loop, I is the peak current in the loop, r is the distance from the center of the loop, $\theta$ is the angle to the loop axis, $\Phi$ is the azimuthal angle, $\eta$ is the characteristic impedance of free space (377$\Omega$), and k is the propagation constant (k is equal to $\omega/c$, where $\omega$ is the angular frequency and c is the speed of light).

From the above equations, it can be seen that the terms varying as 1/r are the far field or propagating terms, and are in-phase with each other. These far field terms contribute a $1/r^2$ term to the Poynting vector and represent real power flowing away from the antenna. The remaining terms of Equations 1-3 are near field terms that represent trapped energy. The important property of this trapped energy is the spatial decay rates of their field components, which are $1/r^2$ or $1/r^3$.

It is apparent that all terms of the above equations are of equal magnitude at a distance given by:

$$r_{boundary} = c/\omega \quad (4)$$

where $r_{boundary}$ roughly defines the boundary of the near field region. Within this region, near field terms dominate, and the field strength varies rapidly with the radial distance, r. Outside of this region, far field terms dominate, and the field strength varies more gradually (i.e., primarily as 1/r).

Equations (1)–(3) also demonstrate that the dipole strength, IA, and the angular frequency, $\omega$, determine the radiation field. As the frequency is increased (or wavelength reduced), the region in which the near field dominates is more restricted to the vicinity of the antenna. Thus, in a near field cellular system, the cell size is largely influenced by the carrier frequency. For office-size cells, a carrier frequency of 5-15 MHz generally is appropriate, but it is to be understood that these systems can be designed to operate at carrier frequencies above and below this range to tailor them to different operating environments.

A small loop antenna electrically appears to be generally similar to an inductor, with the value of the inductance being dependent upon the size and shape of the loop. More particularly a circular loop in air with a radius much larger than the diameter of the wire from which the loop is formed follows the simple law:

$$L = \mu_0 a \left[ \ln \frac{16a}{d} - 2 \right] \quad (5)$$

where a is the loop radius and d is the wire diameter (both in meters), $\mu_0$ is the permeability of free space, and L has the units of henrys. Furthermore, the current flowing in this loop is related to the applied voltage, V, as follows:

$$I = \frac{V}{\omega L} \quad (6)$$

Thus, it will be evident that the voltage necessary to produce a given field strength depends strongly on the size of the loop. Even more pointedly, Equations (1)–(3) demonstrate that the dipole strength, IA, varies directly with loop area, while Equation (5) shows that the inductance varies only as the square root of the loop area times the logarithm of the area. This means that the dipole strength is an increasing function of the loop area when the antenna is driven from a constant voltage source. In other words, a given voltage will produce a stronger field as the area of the loop is increased.

In the U.S., FCC Regulation Part 15.223 imposes a limit on the maximum permissible radiated field strength as measured at 30 meters from an unlicensed source antenna, such as those that are used in cellular systems of the type contemplated by this invention. In view of this constraint, the dipole strength, IA, beyond the near field region as defined above at a carrier frequency of, for example, 5.3 MHz, preferably is:

$$IA \leq 0.0081 \quad (7)$$

where IA has units of (amps m$^2$). From this it will be evident that the area, A, of the loop antenna and the peak current, I, that is applied thereto can be traded off, one against the other, while limiting the far field dipole strength to a desirably low level.

An especially convenient method for driving a loop antenna is to use a class C driver stage connected directly to the loop. A simple resonant circuit having a parallel capacitor and resistor in parallel with the loop allows the loop current to be derived primarily from resonance, rather than from real (D.C.) power (the resistor advantageously is included to provide some bandwidth broadening). If a 5 volt logic level is chosen as the rail voltage for such a driver and if the carrier frequency is selected to be 5.3 MHz, equations (6) and (7) can be used to show that a loop antenna that is formed from wire having a diameter of 0.125 inches can have an area of up to 0.244 m$^2$. After making allowance for an adequate tolerance, loop antennae having areas of about 0.12 m$^2$ (20 in$^2$) have been successfully employed for implementing this invention. The inductance of such a loop is about 300 nH, and the inductive reactance is about 10$\Omega$. Thus, resonance occurs with capacitance of about 3000 pf.

B. Near Field Coupling for Cellular LANs

A LAN typically has adequate bandwidth for supporting essentially simultaneous message traffic to and from a substantial number of different clients. For example, this message traffic may be carried on the LAN in packets or data blocks. each of which is appropriately addressed to one or more of the clients. Preferably, the bandwidth of the LAN is fairly allocated among the clients that are being serviced by the LAN, so that no single client or subset of clients is permitted to consume more than its fair share of the available bandwidth. To accomplish this in a cellular LAN, provision is made for ensuring that a fair, fractional portion of the bandwidth of the LAN is available to each of the cells on a demand basis or on a contention basis. As will be appreciated, a contention controlled access mechanism permits a larger fractional portion of the bandwidth of the LAN to be allocated to each of the cells that are active at any instant in time than a demand access mechanism, but that topic is beyond the scope of this invention.

Indeed "fair sharing" of bandwidth and various strategies for achieving it are topics that have been widely discussed in the literature relating to LANs, so it suffices to note that each of the cells of a cellular LAN suitably is interfaced to the broad bandwidth "backbone" of the LAN by a relatively modest bandwidth channel (for convenience, this broadband backbone sometimes is referred to herein as the "LAN" to distinguish it from the narrower bandwidth, cellular channels by which the clients are interfaced to the LAN).

Figure 4:
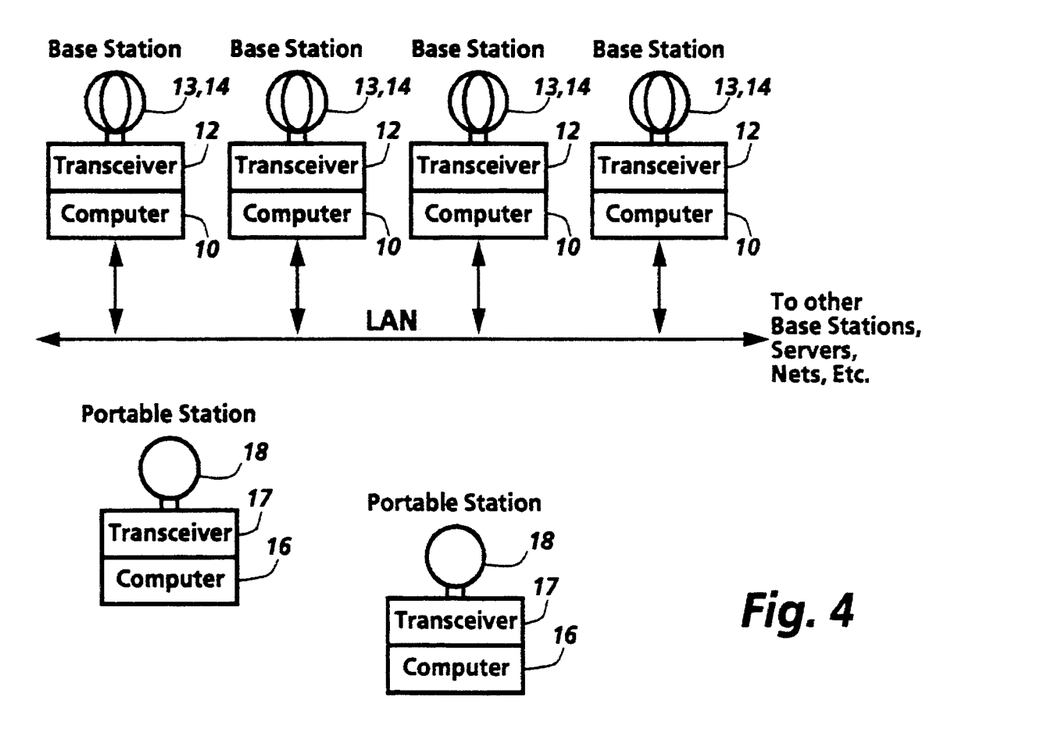
FIG. 4 is a simplified functional block diagram illustrating a system in accordance with the invention.

As shown in FIG. 4, the cellular interface to the LAN comprises a plurality of base stations that are spaced apart from each other for coupling the broadband backbone of the LAN to portable stations that are located within different areas of, say, a building (not shown). There may be some minor overlap near the boundaries of the service areas of adjacent base stations, but the base stations effectively provide mutually independent communication channels for transferring messages to and from portable stations that are located within their respective service cells. Thus, the bandwidths of the cellular interface channels are aggregative. For example, the cells serviced by the different base stations may be dimensioned to span different rooms or different parts of rooms within a building.

As illustrated, each of the base stations includes a computer 10 that is coupled between the LAN and a transceiver 12. Each of the transceivers 12, in turn, has an antenna structure 13, 14 that is configured for effective near field coupling. Phase quadrature antennae generally are preferred for the base stations because of their superior directional insensitivity, but there may be applications in which a base station antenna with a greater directional sensitivity would be acceptable or even desirable. Each of the portable units, on the other hand, typically includes some computational resources 16 (such as a lap top or hand-held computer), a transceiver 17 that is coupled to the computer 16, and an antenna 18 that is coupled to the transceiver 17 for effective near field coupling to a base station antenna 13, 14.

Figure 3:
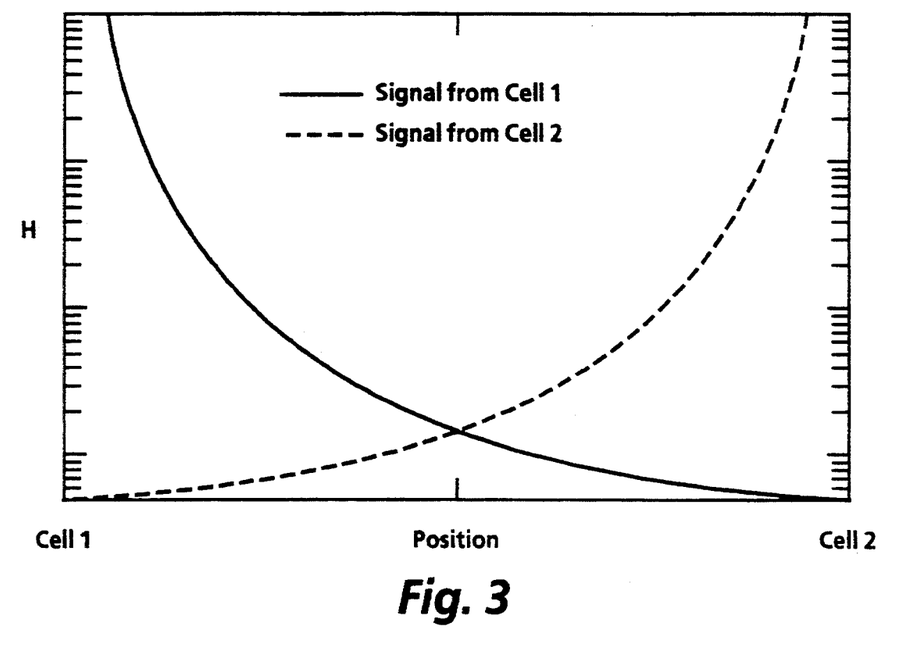
FIG. 3 is a graph illustrating the relative field strengths from adjacent cells employing near-field coupling.

As previously pointed out, near field coupled cellular systems have the advantage of providing more sharply defined cell boundaries than their far field coupled counterparts. This follows primarily from the relatively rapid spatial rate at which the near field strength decreases with increasing radial distance from the source. FIG. 3 illustrates the strong radial dependency of the near field strengths within a pair of adjacent cells. As will be evident, the rapid spatial rates at which the strength of these fields monotonically decay facilitate a monotonic transition from one cell to the next.

The monotonicity of the cell-to-cell transitions in near field coupled systems is further enhanced because these systems typically operate at relatively low carrier frequencies. For example, it will be recalled that when $r_{boundary}$ is chosen to cause the near field terms to dominate over an area that approximates the size of a standard office or similar room, the carrier frequency of choice is on the order of 5 MHz–15 MHz, which is roughly two orders of magnitude lower than the UHF carrier frequencies that are generally used in standard far field coupled systems. In view of the longer wavelengths of these lower frequency carriers, reflections occur only from the larger rf reflectors, such as the metal wall studs, that might be found in a typical indoor environment. These reflectors may or may not be spatially separated from the antenna by a sufficient distance to create standing wave patterns, but the rapid spatial decay rate of the near field effectively guarantees that the reflected energy will be much weaker than original signal. Thus, unlike the far field case (see FIG. 2), near field coupled cellular systems generally provide monotonic cell-to-cell transitions, even when they are operated in reflective environments.

Although the above outlined cell-size argument and the aforementioned FCC Regulation Part 15.223 both tend to favor the use of a lower carrier frequency, there are countervailing considerations that come into play during the selection of the carrier frequency. For instance, each channel must clearly have adequate bandwidth to handle the anticipated message traffic load. Moreover, to simplify the circuit design and to reduce the power consumption, it generally is desirable to restrict the channel bandwidth to a value that is appreciably less than the carrier frequency. Therefore, the data rates that are used preferably are well below the carrier frequency. Fortunately, these goals usually can be achieved while using a resonant antenna. For example, if the antenna has a Q of about 10, a 5.3 MHz carrier suitably is modulated at data rates of up to about 250 kbps using fsk (frequency shift keying) modulation. Of course, this example merely illustrates one specific case, but it has broader significance because it demonstrates a rational design strategy.

C. More on the Base Stations and the Portable Stations

As illustrated, the base stations and the portable stations are half-duplex devices, so each of them suitably utilizes a single antenna structure for both transmitting and receiving. The sensitivity of these antennae is not very critical because the noise floor in the portion of the RF spectrum that generally is used to carry out this invention is determined primarily by the electromagnetic interference (EMI) that ordinarily exists in offices and similar environments. However, inasmuch as loop antennae are favored, it is to be understood that provision advantageously is made to at least partially counter the directional sensitivity that such antennae tend to exhibit. To accomplish that, each base station antenna has two loops 13 and 14 which are physically oriented at 90° with respect to each other. During transmission, these two loops 13 and 14 are electrically driven in phase quadrature to cause rotation of the polarization of the signals they transmit. Reception, on the other hand, is carried out by combining the signals that are sensed by the loops 13 and 14 in phase quadrature. If desired, a similar technique could be used to reduce the directional sensitivity of the loop antennae for the portable stations, but it generally is not necessary to do so because the base stations usually are sufficiently directionally insensitive in both their transmit and receive modes and the portables can be manually reoriented, if need be, for satisfactory reception.

Figure 5:
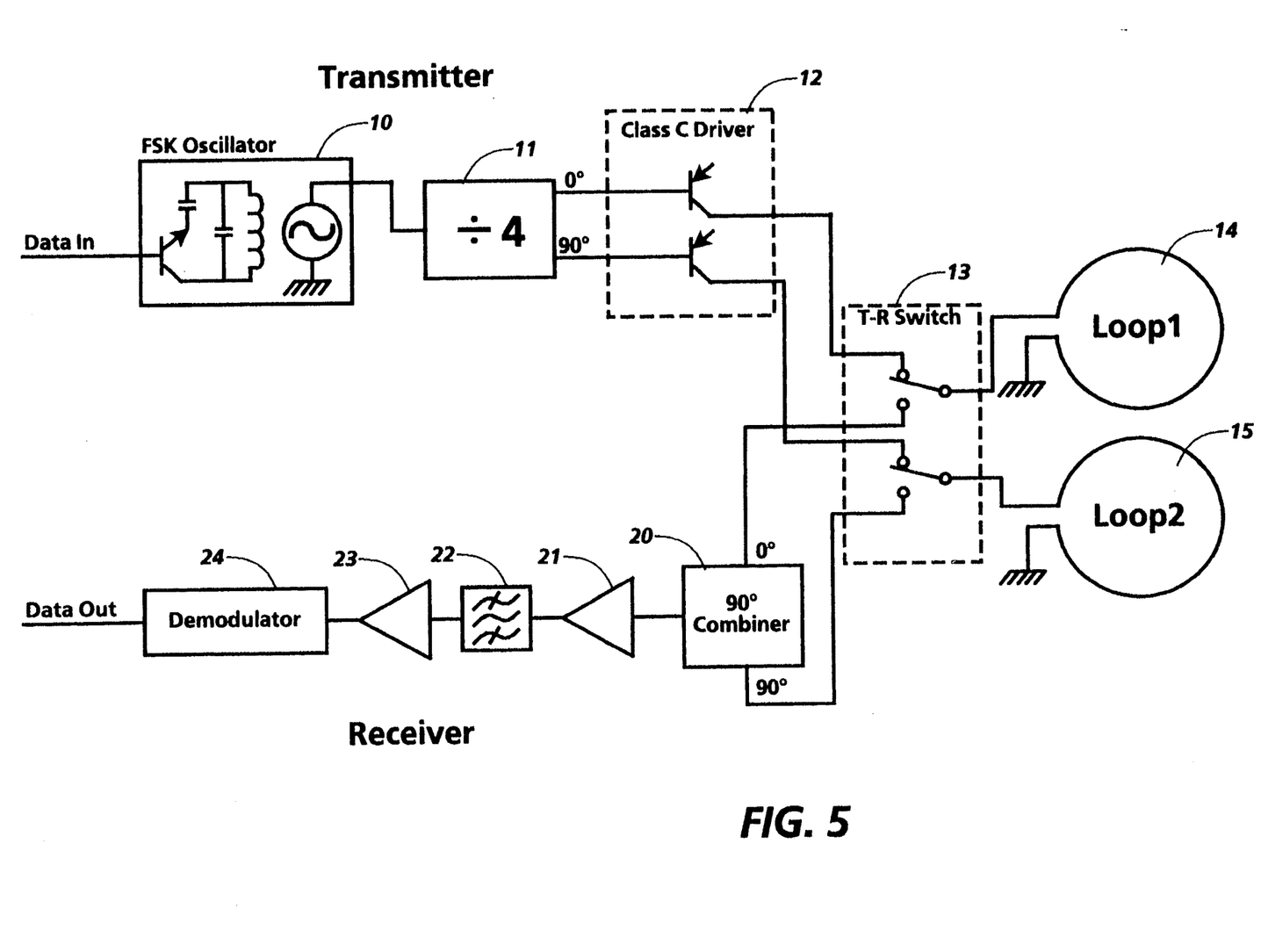
FIG. 5 is a simplified functional block diagram of a base station transceiver in accordance with the invention.
Figure 6:
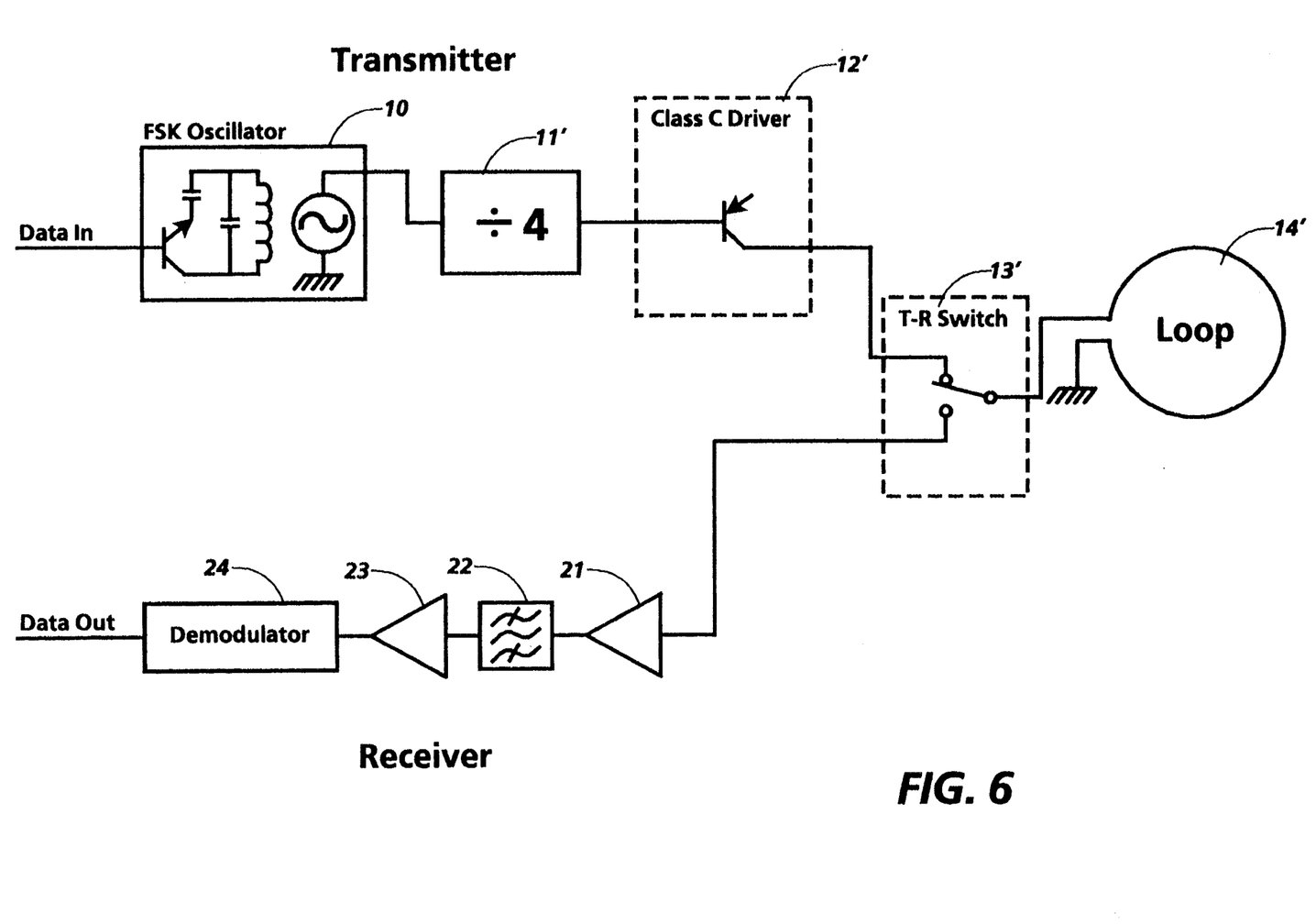
FIG. 6 is a simplified functional block diagram of a portable transceiver in accordance with the invention.
Figure 7A:
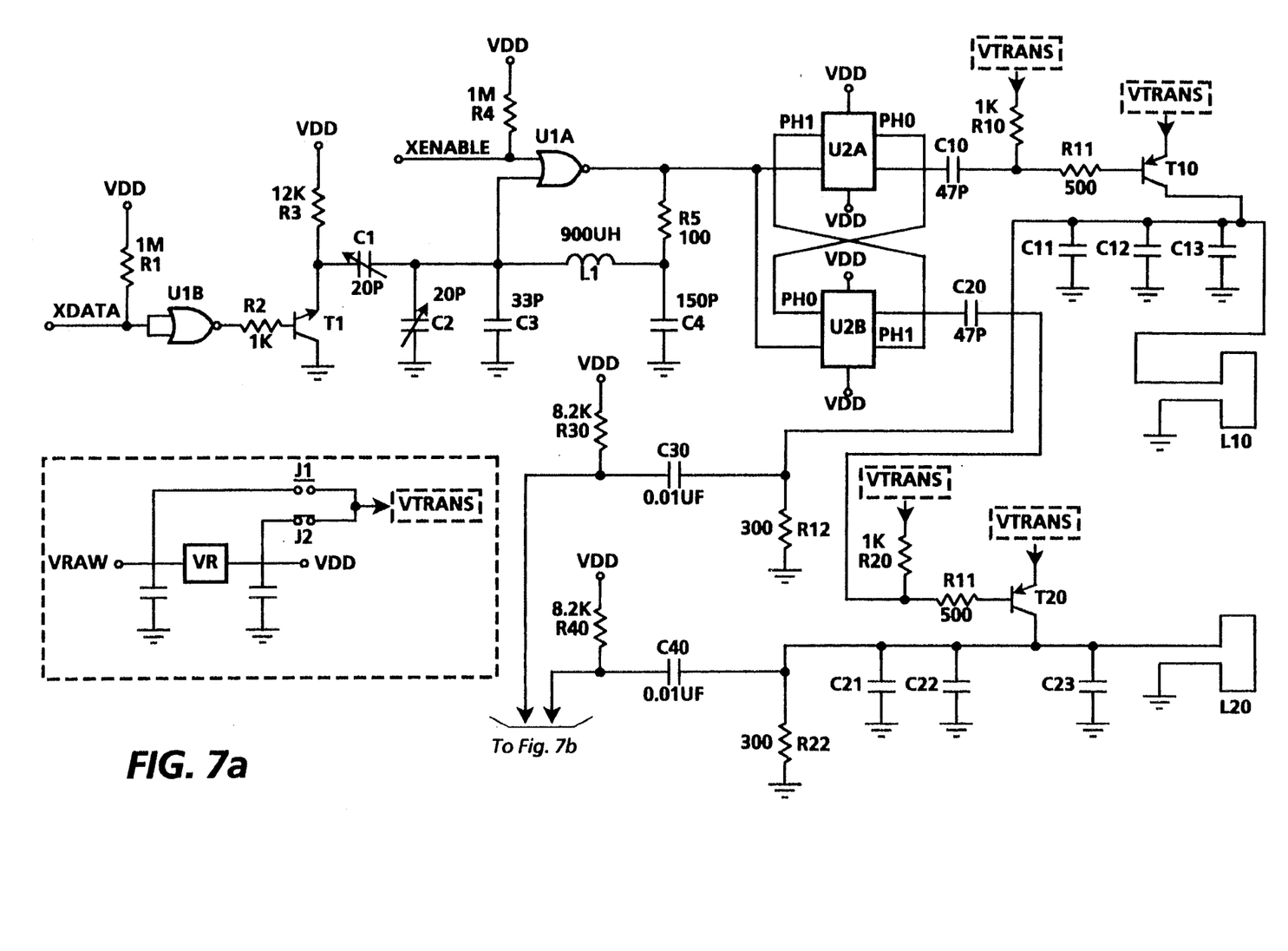
FIGS. 7a and 7b, when joined as indicated, form a circuit diagram of an embodiment of a base station transceiver in accordance with the invention.
Figure 7B:
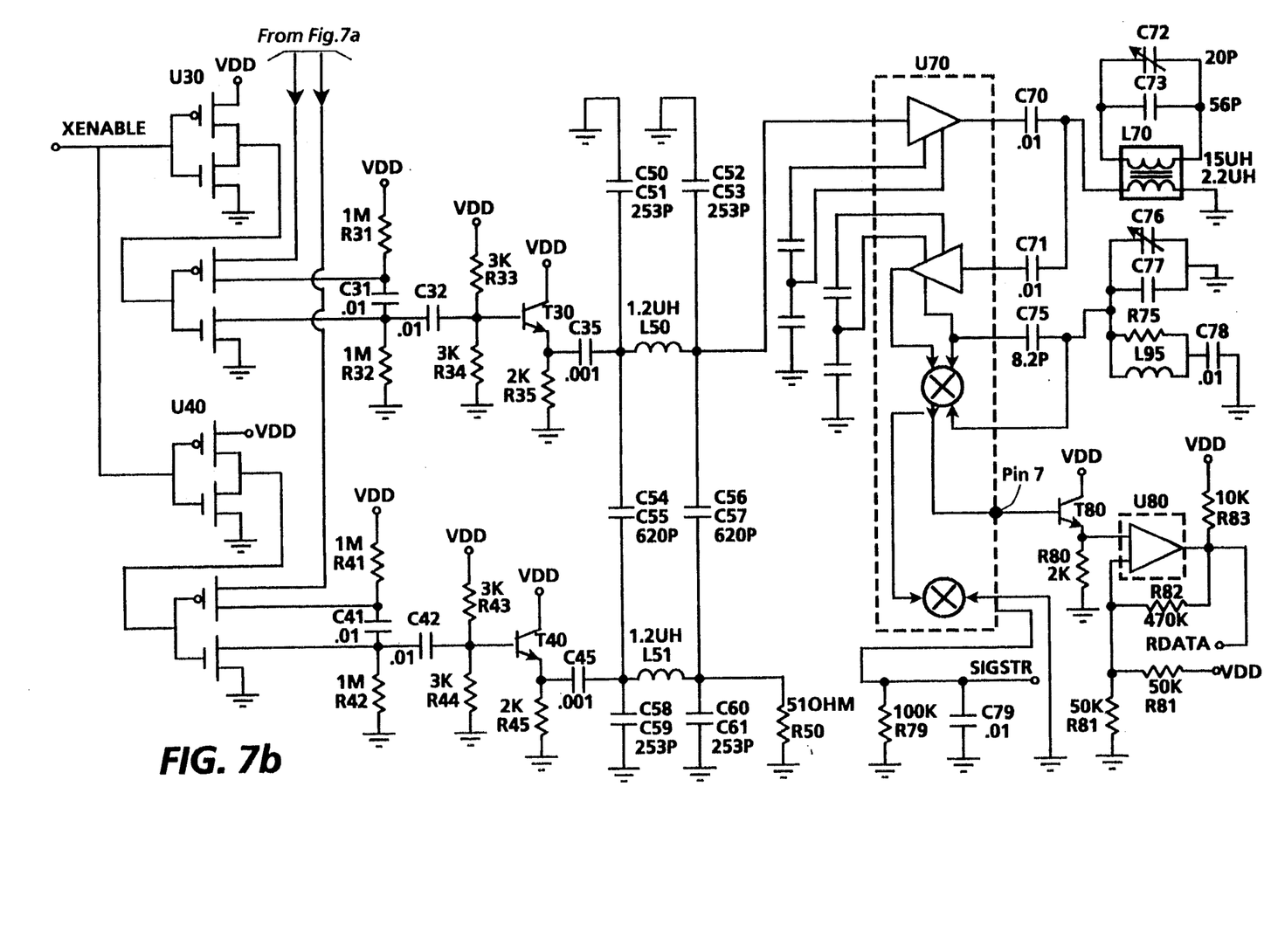
Figure 8A:
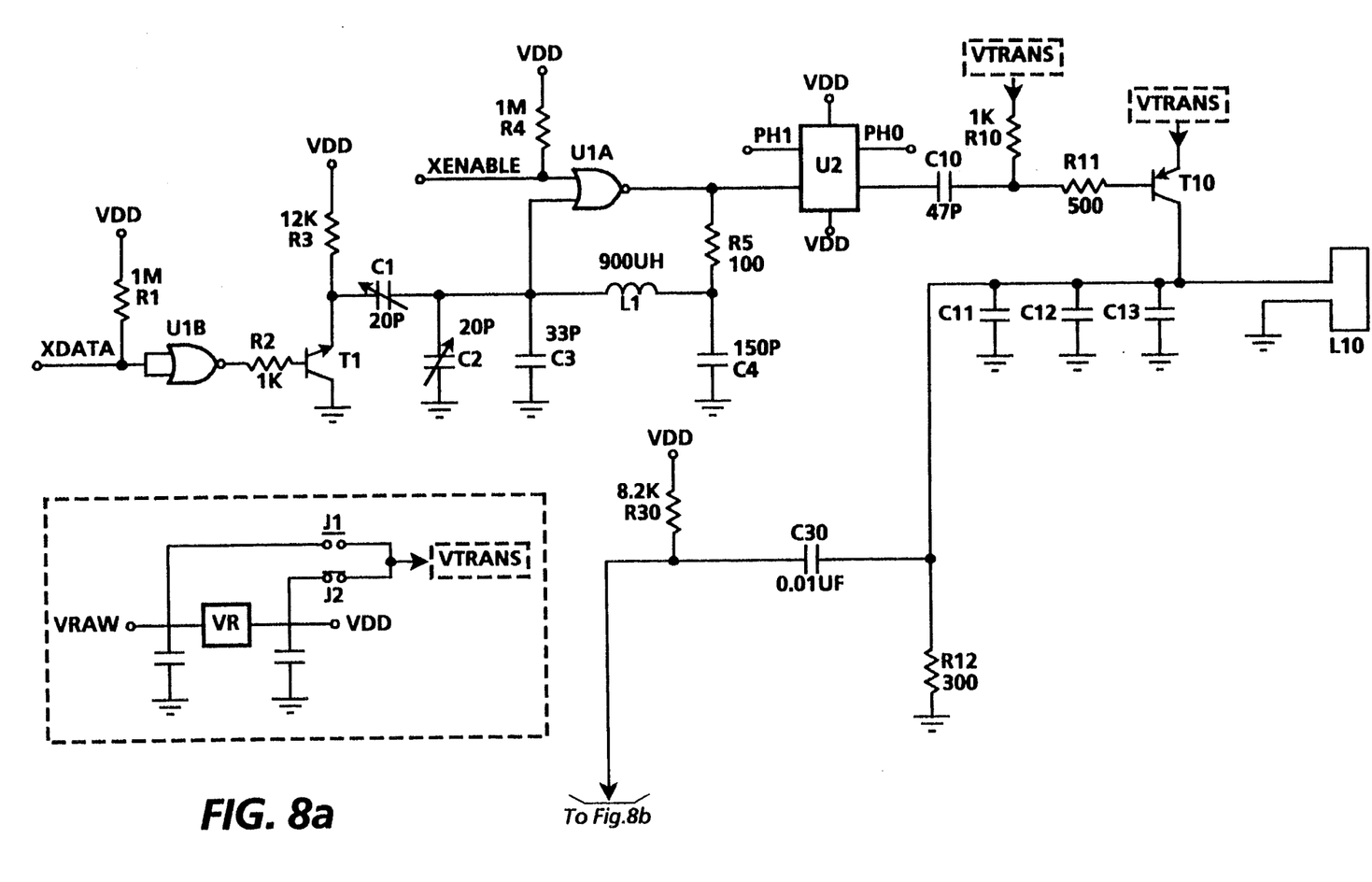
FIGS. 8a and 8b, when joined as indicated, form a circuit diagram of an embodiment of a portable station transceiver in accordance with the invention.
Figure 8B:
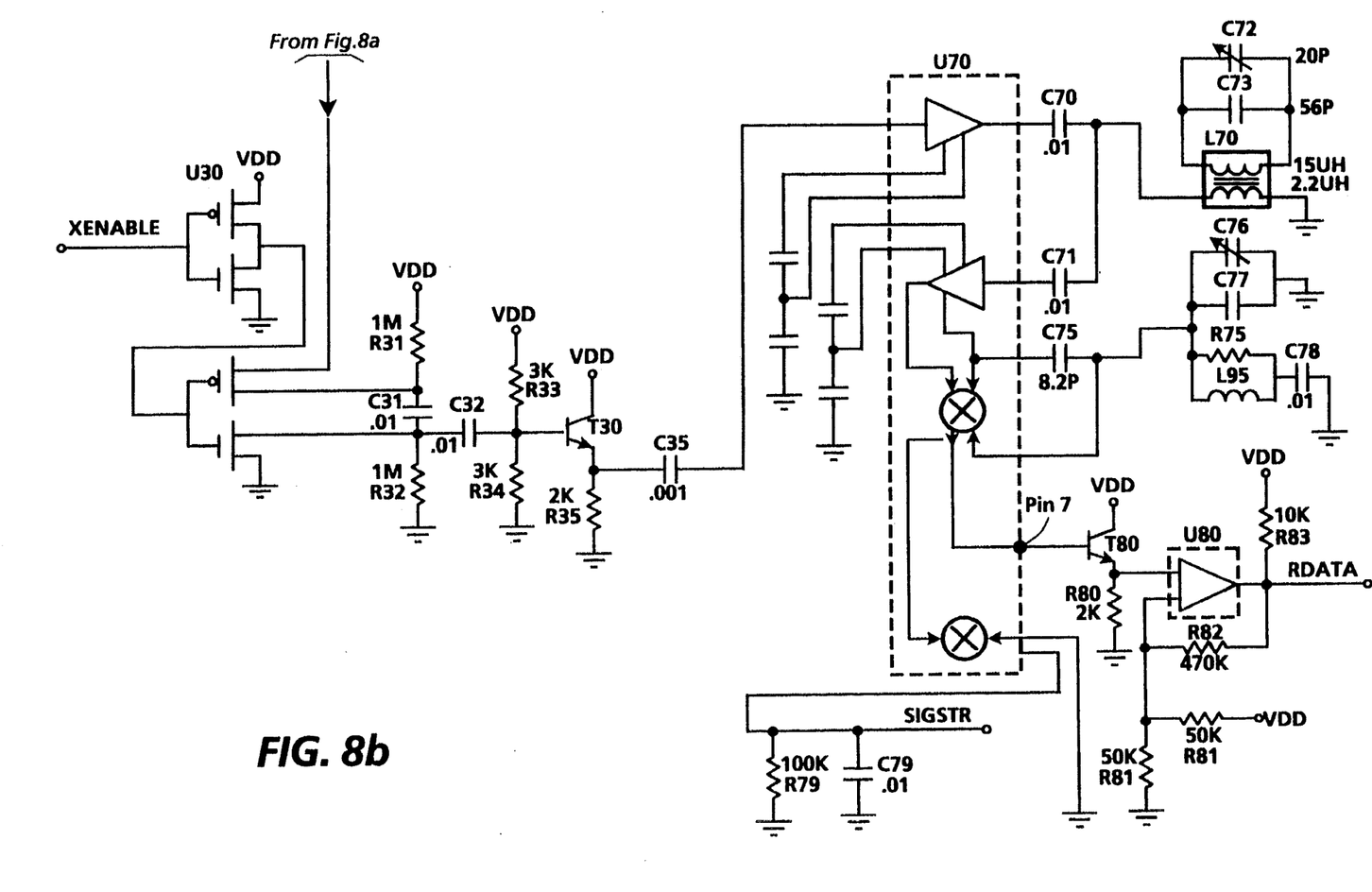

Focusing now on FIGS. 5 and 6. it will be evident that the base stations (FIG. 5) and the portable stations (FIG. 6) suitably have the same basic architecture. Indeed, in this instance, apart from the provision that is made in the base stations for splitting and combining the signals that are applied to and sensed by their dual loop antennae, the base stations and the portables are architecturally identical. Accordingly, like reference numerals are used in FIGS. 5 and 6 to identify like parts.

The transceivers for the base stations and the portable stations each have a transmit/receive (T/R) switch 13 and 13', respectively, that is operated to selectively disable and enable the transmit channel within the transceiver while making and breaking, respectively, a connection between the antenna and its receive channel. T/R switches are well known and various types can be employed, so the switches 13 and 13' are depicted in simplified schematic form.

As shown, the transmit channel of each of the transceivers includes a modulator 10 for modulating a suitable carrier signal in accordance with the data that is to be transmitted, such as by frequency shift modulation. The frequency of this modulated carrier may then be stepped down, such as by a frequency divider 11 or 11', to the carrier frequency that is desired for transmission. For example, in the illustrated embodiment, the transmit channel of each of the base station transceivers includes a $\div 4$ frequency divider 11 because the divider 11 is a convenient means for producing the phase quadrature signals that are used for driving the dual loop base station antenna 13, 14. A similar frequency divider 11' is included in the transmit channel of each of the portable stations, but it is used in the portables merely to provide the architectural consistency that facilitates the use of common parts. Thus, as shown in FIG. 5, the phase quadrature outputs of the divider 11 are applied to the loops 14 and 15 of the base station antenna via respective class C amplifiers 12. FIG. 6, on the other hand, shows that just one of the outputs of the divider 11' is applied to the single loop 14' of the portable station antenna by a class C amplifier 12'.

The receive channels of the base station transceivers also are only slightly more complex than the receive channels of the portable transceivers. Specifically, as shown in FIG. 5, the receive channel of each of the base station transceivers includes a quadrature combiner 20 for combining the signals that are sensed by the individual loops 13 and 14 of the dual loop base station antenna in phase quadrature with each other, thereby producing a directionally desensitized version of any incoming modulated carrier signal. Otherwise, however, the receive channels of the transceivers for the base stations and portable stations function essentially identically and share common parts. Thus, in both of them, the incoming carrier signal typically is amplified by an amplifier 21, and this amplified signal then is filtered by a bandpass filter 22 to filter out extraneous noise. The modulated carrier signal then suitably is further amplified by another amplifier 23 before being demodulated by a demodulator 24 to recover the data that it carries.

D. A Specific Implementation

While the foregoing describes the present invention in terms that will enable the artisan to take advantage of it in a variety of different ways, a specific implementation is described in this section in the interest of completeness. Designers may find that the practical example that is provided by this portion of the disclosure is useful, but it is to be understood that this detailed example is not intended to detract from the generality of this invention or to otherwise limit its scope.

With the foregoing in mind, it will be seen that FIGS. 7a and 7b and FIGS. 8a and 8b are circuit diagrams of a base station transceiver and a portable station transceiver, respectively, for one embodiment of the invention. As previously mentioned, these transceivers are substantially identical, with the exception that the base station transceiver includes a second antenna loop for forming a dual loop antenna which is driven by the phase quadrature outputs of a phase splitter when the transceiver is operating in its transmit mode and from which incoming signals are received by a quadrature combiner when the transceiver is operating in its receive mode. Accordingly, the circuits shown in FIGS. 7a and 7b and FIGS. 8a and 8b will be described together, it being understood that certain portions of the description are applicable only to FIG. 7a and 7b.

As illustrated, the transmit channel of the transceiver (sometimes referred to herein as a "transmitter") includes a high frequency oscillator that is composed of a gate U1A, an inductor L1, and several associated capacitors. When the XENABLE input of the gate U1A is driven to a low ("0") logic level, a Colpitts oscillator, which nominally oscillates at four times (4×) the desired carrier frequency, is triggered into operation. The enable signal, XENABLE, for the oscillator typically is supplied by an associated computer (see FIG. 4) while the computer is operating in a transmit data mode.

Since frequency shift keying (fsk) is used for modulating the carrier, a phase-continuous technique is employed for shifting the output frequency of the oscillator back and forth between two preselected frequencies. Although the frequency shift could be effected with a voltage-variable capacitor, the circuit of the transmitter employs a much simpler method. Specifically, it will be observed that the output frequency of the oscillator is largely determined by the inductor L1 and the combination of the capacitors C2 and C3. Therefore, if an extra capacitor is selectively inserted and removed from across the capacitor C2, the output frequency of the oscillator will shift accordingly. Thus, the fsk modulation of the signal supplied by the oscillator is performed by an inverse connected transistor T1 under the control of the data XDATA that are applied to its base via a gate U1B. When turned on (i.e., switched into conduction) by the voltage at its base, the transistor T1 effectively connects the capacitor C1 in parallel with the parallel combination of capacitors C2 and C3, thereby reducing the output frequency of the oscillator. Thus, it will be apparent that the upper frequency of the fsk modulated signal is determined primarily by the capacitors C2 and C3, while its lower frequency is largely determined by the parallel combination of capacitors C1, C2 and C3.

An inverse-connected configuration is employed for the transistor T1 in order to lower its gain. It, therefore, may be useful to note that if the transistor T1 was connected in the conventional manner, its operation would be far less reliable because it would be at risk of being inadvertently switched into conduction (this risk is appreciable because a large signal on the collector of the transistor T1 would be coupled to its base via its base/collector capacitance $C_{bc}$). Inversely connecting transistor T1 causes it to act as a slow, relatively insensitive switch, so a substantial amount of base drive current is required to switch it into an "on" state. However, that is a small price to pay for the increased reliability that the inverse connection of the transistor T1 provides.

The frequency of the fsk modulated signal is stepped-down by a divide by four ($\div 4$) frequency divider that is composed of a pair of cross-coupled D-type flip-flops U2A and U2B. The divider U2A/B not only steps down the carrier frequency of the fsk modulated signal to the 5.3 MHz carrier frequency that is desired for transmission, but it also functions in the base station transceiver as a phase splitter for splitting the fsk modulated signal into a pair of phase quadrature components. The phase quadrature outputs of the divider U2A/B, in turn, are used for driving the two orthogonal loops L10 and L20 of the base station antenna in phase quadrature. Identical divider circuitry U2A/B is provided for the portable station to take advantage of the resulting parts commonality, but only one of its outputs is employed for driving the single loop antenna of the portable.

In the base station transceiver, the phase quadrature outputs of the divider U2A/B are coupled to class C driver transistors T10 and T20 for driving the antenna loops L10 and L20, respectively. Again, only one of these class C drivers is used in the portable. Transistors T10 and T20 typically provide a voltage swing of about 8v peak to peak for driving resonant antenna loops of the above-described type when the terminals VTRANS are held at about 5 volts by the voltage regulator VR. If desired, however, the voltage applied to the antenna loops L10 and L20 can be increased slightly by inserting a jumper at J1 and removing a jumper at J2, whereby the voltage regulator VR then is bypassed in favor of connecting the terminals VTRANS to the voltage supply $V_{RAW}$. Of course, if this higher voltage alternative is employed, the time constants of the RC networks R10, R11, C10 and R10, R21, C20 may need to be changed in a corresponding manner.

A double-sided T/R switch comprised of FET arrays U30 and U40 is provided for isolating the receive channel of the base station transceiver from its antenna L10, L20 while the transceiver is operating in a transmit mode. A single-sided T/R switch performs the same function in the portable station transceiver. As will be appreciated, in the absence of the T/R switch, the strength of the signal that is applied to the antenna while it is transmitting would overload the receive channel, thereby charging various capacitors therein sufficiently to shift its bias points. If such overloading were permitted, each transmission by a transceiver would have to be followed by a substantial recovery time to permit the receive channel of that transceiver adequate time to restore itself to normal operation. Accordingly, it will be evident that the receive channel isolation that the T/R switch affords while such a transceiver is operating in a transmit mode greatly decreases the turn-around time of the transceiver. Typically, the FET arrays U30 and U40 respond sufficiently promptly when XENABLE returns to a high ("1") logic level (which signals the termination of the transmission) to restore the receive channel to a fully operational state in just a few bit times (assuming a data rate on the order of 250 kbps).

When the base station transceiver is operating in its receive mode, signals sensed by the antenna loops L10 and L20 are routed through the T/R switch to buffer amplifiers comprised of transistor amplifiers T30 and T40, respectively. Again, the single-sided equivalency of the receive channel of the portable station transceiver will be evident. The amplifiers T30 and T40 are biased so that when current is being drawn by capacitors C35 and C45 an output driving impedance of about 50 $\Omega$ is obtained at 5.3 MHz. In the base station transceiver, this enables a network comprised of inductors L50 and L51, capacitors C50–C61 and resistor R50 to effectively function as a phase combiner for combining the 5.3 MHz signals sensed by the antenna loops L10 and L20 in phase quadrature with each other. There is no counterpart to this phase combiner in the receive channel of the portable transceiver because there is no need for it. However, in both transceivers the received signal is next is applied to an IF amplifier/detector U70.

In this particular embodiment, U70 suitably is a Signetics NE614, which is a low power FM IF/quadrature detector with limiting and signal strength outputs, as well as provision for external bandpass filtering. No heterodyne conversion is necessary, because (i) adequate gain is available from U70 at 5.3 MHz, (ii) the bandwidth requirements are not too restrictive, and (iii) no frequency agility is required in this application. As illustrated, the inductor L70 and the capacitors C72, C73 form a bandpass filter, while the inductor L75, the resistor R75, and the capacitors C75, C76 and C77 form a phase shifter for the internal quadrature detector of U70. The internal quadrature detector of the Signetics NE614 device provides about 1 volt p-p output signal at pin 7 for a 400 KHz deviation of the input signal. This signal, in turn, is buffered by transistor T80, and then is passed through a thresholding comparator U80, with a slight amount of hysteresis, to recover the baseband data (i.e., the data carried by the modulated carrier). This baseband data, RDATA, produces a serial data stream that is loaded into a suitable computer to complete the cellular phase of the data transfer task.

As will be appreciated, certain of the design choices that were made while implementing the above-described transceiver dictated some of the other features of the design. For example, the use of the Signetics NE614 device as the IF amplifier/detector U70 led to the use the buffer amplifier T80 because the output impedance at pin 7 of the Signetics device is sufficiently high to cause severe signal degradation if it was used to directly drive even the small capacitance at the input of the comparator U80. The transistor T80, therefore, performs the beneficial function of sharpening the received signal transitions. Similarly, the buffer amplifiers T30 and T40, along with the quadrature network (in the base station transceiver) are employed to create a deliberate impedance mismatch at the input to the FM IF/quadrature detector U70. The mismatch is created because the Signetics NE614 device has shown a tendency to oscillate at the frequencies that are of interest. Apparently, at the operating frequencies that are favored for carrying out this invention, there often is enough stray coupling capacitance between the IF output and the IF input of the Signetics device to cause oscillation to occur. Thus, the impedance mismatch at the input to U70 is designed to suppress this unwanted oscillation by providing a relatively low impedance shunt path for the feedback that tends to cause such oscillation.

E. Extensions

Transmitters and receivers constructed in accordance with the invention have shown great promise when a carrier frequency of 5.3 MHz was used, and the power level was chosen to stay within FCC regulations for license-free operation. The resulting near field pattern has been found to have a useful range of about 12–15 feet, and data rates of 250 kbps have been achieved.

Peaks and nulls are not evident in this system, except for those that are caused by the directional sensitivity of the single loop antennae of the portable transceivers. Indeed, the directional sensitivity of the portable transceivers typically is not a performance issue, except when such a transceiver is located near a cell boundary. Furthermore, it is an issue that can be addressed easily by simply re-orienting the portable so its antenna is better aligned with the base station with which the portable is communicating.

However, some additional improvements can be made beyond the simple dipole system discussed above. The general goal, of course, is to provide well-defined cell boundaries, and good coverage within cells. For example, in principle it is possible to carry the above-described dipole concept further by introducing higher order sources, such as quadrupoles. A quadrupole source is the functional equivalent of two closely spaced dipoles, acting in opposite directions. The resulting field, therefore, has a near field component which decays as $1/r^4$. Furthermore, several sources can be grouped into a single cell, so as to tailor the near field pattern to a desired shape. Such grouping may include several dipoles or several quadrupoles, or a combination of both, driven from the same source, so as to improve the uniformity of coverage within a cell.

The loop antennae of the above described embodiments of the invention are especially well suited for use in rooms of comparable length and width, such as an ordinary office. However, it sometimes may be desirable to support communications between a base station and portable stations in a long narrow area, such as in a hallway or corridor. At first blush, it may be thought that a long wire antenna would be an attractive option for near field coupling in a hallway or similar area. However, such an antenna tends to causes interference with adjacent cells, and is subject to restrictive governmental radio emission standards. In addition, long wire antennae generally have nulls because of the standing wave patterns that are generated with them when they are excited by RF signals, so they are ill-suited to providing the uniform coverage that is desired.

Figure 9:
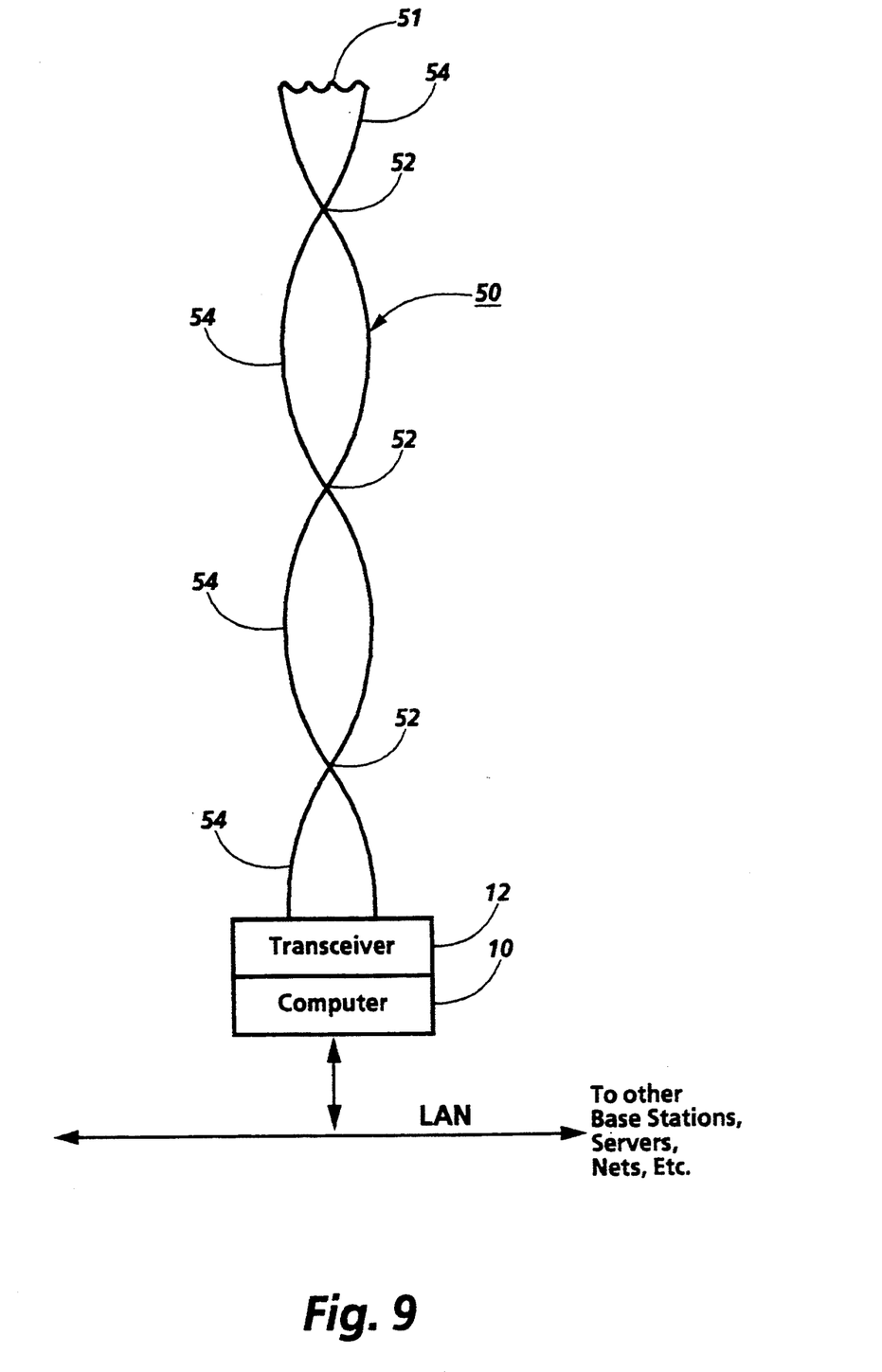

Thus, turning to FIG. 9, this invention deals with the problem of providing near field coupling coverage within these more irregularly shaped cells by equipping the base station transceiver 12 with a twisted loop antenna 50. In this arrangement, only a single antenna loop is employed by the base station, instead of the dual loop antenna as described above. However, this single loop antenna 50 is composed of two wires that are twisted together or otherwise overlapped as at 52 to effectively subdivide the antenna 50 into a series of oppositely polled dipole segments 54. Each of these segments 54 is shorter than the wavelength ($\lambda$) of the rf energy that is applied to the antenna by the transceiver 12. Indeed, they typically are on the order of $\frac{1}{4} \lambda$ long. However, they each are of ample length for transmitting and receiving near field rf signals over a distance of a few feet, even in the presence of the relatively high noise level that is likely to exist because of the overall length of the antenna 50. Desirably, the antenna 50 is terminated by a balancing resistor 51 to provide a sink for the drive current that is applied thereto when the transceiver 12 is operating in its transmit mode, thereby suppressing signal reflections and the standing wave patterns that such reflections would cause. In practice, the antenna 50 may be fabricated to contain one or more twists of the two wires, or it may be formed by a simple crossing of the wires, so it is to be understood that "crisscrossing" is used herein as a generic description of such an arrangement. Furthermore, the antenna 50 may be installed in a straight line, for example to provide single cell coverage of a hallway or the like. Or, it can be installed in a curved, dog-legged, or zig-zag pattern to cover areas of various shapes and sizes.

While the invention has been disclosed and described with reference to a single embodiment, it will be apparent that variations and modification may be made therein. Therefore, the following claims are intended to cover all variations and modifications that fall within the true spirit and scope of the invention.

What is claimed is:

1. A near field coupled cellular communication system for providing two-way communication services within a predetermined service area that is composed of a plurality of service cells; said system comprising
   a plurality of stationary base stations that are spatially located within respective ones of said service cells, each of said base stations having an antenna for transmitting output signals and for sensing input signals, with the antenna of each of said base stations has two loops that are physically oriented in quadrature relationship with respect to each other, and with each of said base stations including means for driving the loops of its antenna in phase quadrature to transmit said output signals, and means for combining signals sensed by the loops of its antenna in phase quadrature to sense said input signals;
   at least one portable station that is transportable from position-to-position and from cell-to-cell within said service area, each portable station having an antenna for transmitting output signals and for sensing input signals;
   said base stations being positioned to cause the antenna of each portable station that is within said service area to be near field coupled to the antenna of at least one of said base stations whenever signals are being transferred in either direction between said portable station and said base station, with the near field coupling of said antennae being sufficiently strong to predominantly govern the transfer of said signals;
   said signals being modulated carrier signals, with each of said signals having a carrier that has an angular frequency of approximately $\omega$ radians/sec.; and
   every point within said service area is located within a distance of approximately $r_{secondary} = c/\omega$ of the antenna of at least one of said base stations, where c is the speed of light.

2. The communication system of claim 1 wherein said service area is confined to a building.

3. The communication system of claim 2 wherein said modulated carrier signals have a carrier frequency within a range of 5 MHz–15 MHz.

4. The communication system of claim 3 wherein
   said building has a plurality of rooms; and
   at least some of said base stations are located in different rooms.

5. A cellular local area network comprising
   a relatively broad bandwidth communication medium for distributing data throughout a predetermined service area;
   a plurality of narrower bandwidth, spatially stationary base stations that are linked to said communications medium for transferring data from and to said communications medium; said base stations being spatially distributed within said service area to define respective service cells; each of said base stations having an antenna for transmitting and sensing data modulated carrier signals;

at least one portable station that is transportable from location-to-location and from cell-to-cell within said service area; each portable station having an antenna for transmitting and sensing data modulated carrier signals;

said portable station, while it is anywhere within said service area, having its antenna sufficiently proximate the antenna of at least one of said base stations to achieve near field coupling therebetween whenever signals are being transferred in either direction between said portable station and said one base station, with said near field coupling being sufficiently strong to dominate the transfer of said signals;

each of said base stations being further characterized by the antenna thereof being a dual loop antenna that is composed of first and second antenna loops that are spatially oriented in quadrature relationship with respect to each other;

each of said base stations further including means for driving its first and second antenna loops in phase quadrature when said base station is operating in a transmit mode, and means for combining the signals sensed by its first and second antenna loops in phase quadrature while said base station is operating in a receive mode; and each portable station being further characterized by the antenna thereof being a loop antenna.

6. The local area network of claim 5 wherein
said service area is located within a building having a plurality of rooms; and
at least some of said rooms are within different ones of said cells.

7. The local area network of claim 6 wherein
said carrier signals have a carrier frequency of 5 MHz–15 MHz and an angular frequency of $\omega$;
every point within each of said cells is located within a distance of approximately $r_{boundary} = c/\omega$ of the antenna of at least one of said base stations, where c is the speed of light.

8. The local area network of claim 7 wherein
each of said cells contains the antenna of a respective one of said base stations, such that said base stations are dedicated to different ones of said cells; and
every point within each of said cells is located within a distance of approximately $r_{boundary} = c/\omega$ of the antenna of the base station that is dedicated to that cell and at greater distance from the antenna of each base station that is dedicated to a different cell.

* * * * *